United States Patent
Savant et al.

[11] Patent Number: 6,159,398
[45] Date of Patent: *Dec. 12, 2000

[54] METHOD OF MAKING REPLICAS WHILE PRESERVING MASTER

[75] Inventors: Gajendra D. Savant; Abbas Hosseini, both of Torrance, Calif.

[73] Assignee: Physical Optics Corporation, Torrance, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/052,586

[22] Filed: Mar. 31, 1998

[51] Int. Cl.$^7$ ........................................ B29D 11/00
[52] U.S. Cl. .................. 264/2.5; 264/1.36; 264/1.37; 264/102; 264/225
[58] Field of Search ............................. 264/1.9, 25, 219, 264/220, 1.1, 1.36, 1.37, 101, 102, 225, DIG. 78

[56] References Cited

U.S. PATENT DOCUMENTS

| | | | |
|---|---|---|---|
| 4,044,939 | 8/1977 | Horst et al. | 264/2.5 |
| 4,567,123 | 1/1986 | Ohtaka et al. | 264/2.5 |
| 4,832,966 | 5/1989 | Newsteder | 264/219 |
| 5,071,597 | 12/1991 | D'Amato et al. | 264/2.5 |
| 5,183,597 | 2/1993 | Lu | 264/1.9 |
| 5,609,939 | 3/1997 | Petersen et al. | |

*Primary Examiner*—Mathieu D. Vargot
*Attorney, Agent, or Firm*—Nilles & Nilles, S.C.

[57] ABSTRACT

An improved method of making laminated optical components through the use of a master and several submasters is disclosed. A glass/photoresist master is made by recording optical surface features in the photoresist with coherent or incoherent light. The master is processed to reveal the surface features. A frame is fastened to the edges of the photoresist/glass master with edges rising slightly above the top surface of the master. Silicone rubber is poured into the frame over the photoresist layer and allowed to cure. The silicone rubber submaster is then separated from the photoresist/glass master. Use of silicon rubber permits separation of the submaster without damaging the master. Additionally, silicone rubber is less prone to shrinkage than prior art submasters thus permitting more accurate copying of the surface features of the photoresist/glass master. Subsequent epoxy replicas may then be made from the silicone rubber submaster.

22 Claims, 3 Drawing Sheets

METHOD OF MAKING REPLICAS WHILE PRESERVING MASTER

BACKGROUND OF THE INVENTION

1. Field of the Invention

The present invention relates in general to the field of making laminated components. More particularly, the present invention relates to a method of making laminated optical components through the use of a master and several submasters. Specifically, a preferred embodiment of the present invention relates to a method of making an optical diffuser using a master and several submasters whereby the master is preserved in the process.

2. Discussion of the Related Art

Methods for manufacturing and replicating optical components utilizing a master and several submasters to achieve a final product having desired characteristics are well known. One example of such a method is that used to make viewing screens and homogenizers by generating a surface structure in a photosensitive medium using coherent light, processing the medium, and replicating the surface structure in epoxy. Several submasters, made in sequence from each other, are required to produce an optical product having the desired optical characteristics due to shrinkage of the photosensitive material at different stages in processing. For instance, to make a viewing screen having a viewing angle of, say, 30° in the vertical direction by 90° in the horizontal direction, a master must be made having a viewing angle of roughly 60° in the vertical direction by 130° in the horizontal direction. Then, a number of submasters are made in sequence from each other, each of which has a viewing angle somewhat less than the viewing angle of the master, until a submaster having close to the desired viewing angle of 30° vertical by 90° horizontal is achieved. The final product is then made from this last submaster.

Unfortunately, the creation of the first generation submaster from the master destroys the master and therefore that master is not available for later use should one of the subsequent submasters become unusable. It would be advantageous and highly cost effective to be able to preserve the master and store it in a library of masters to be utilized at any future time when optical products having those desired characteristics are needed.

Additionally, another problem inherent in the above-described process is that the "aspect ratio" of the surface structure of each of the submasters degenerates from generation to generation (i.e., submaster to subsequent submaster). For example, as the number of generations increase, the depth of the surface structures decreases thus reducing aspect ratio and the optical performance of the product.

Finally, optical products having light outputs with larger angular spectrums must be recorded with small feature sizes. As the feature size used for recording decreases, defects in the masters and submasters become more apparent. This problem is exacerbated for optical products having larger surface areas. Hence, the manufacturing process includes significant wasted materials if the number of defects is high.

U.S. Pat. No. 5,365,354 entitled "Grin Type Diffuser Based on Volume Holographic Material," U.S. Pat. No. 5,534,386 entitled "Homogenizer Formed Using Coherent Light and a Holographic Diffuser," and U.S. Pat. No. 5,609,939 entitled "Viewing Screen Formed Using Coherent Light," all owned by the present assignee, relate to methods for recording optical products such as diffusers and replicating those diffusers so that they may be mass produced. Each of these U.S. patents is incorporated by reference herein for purposes including, but not limited to, indicating the background of the present invention and illustrating the state of the art. Related U.S. patent applications include Ser. No. 08/595,307, now U.S. Pat. No. 5,956,106, entitled "LCD With Light Source Destructuring and Shaping Device," Ser. No. 08/601,133, now U.S. Pat. No. 5,838,403, entitled "Liquid Crystal Display System with Collimated Backlighting and Non-Lambertian Diffusing," Ser. No. 08/618,539, now U.S. Pat. No. 5,735,938, entitled "Method of Making Liquid Crystal Display System," and Ser. No. 08/800,872, now U.S. Pat. No. 5,922,238, entitled "Method of Making Replicas and Compositions for Use Therewith." All the above applications are owned by the present assignee and are hereby incorporated by reference for purposes including, but not limited to, indicating the background of the present invention and illustrating the state of the art.

SUMMARY OF THE INVENTION

A primary object of the present invention is to provide a method for making a replica of a master containing optical features without destroying the master. It is another object of the invention to provide a method of making replicas of masters containing optical features in which the curing of the replicas results in relatively small shrinkage and distortion or change in the angular output spectrum of the replica as compared to that of the master.

In accordance with the present invention, these objects are achieved by providing a method of creating a submaster for an optical product by recording optical features on a photosensitive material using coherent or incoherent light, processing the photosensitive material to create a master, pouring a layer of rubber, such as RTV silicone, over the master so as to realize the optical surface features of the master in the rubber, allowing the rubber to cure and separating the rubber from the master to obtain a rubber submaster. The rubber submaster may be used to make successive generations of submasters and/or final optical products by covering the submaster with a layer of epoxy, covering the layer of epoxy with a plastic substrate, curing the epoxy and separating the epoxy from the submaster.

In accordance with yet another aspect of the invention, these objects (except for preservation of the original master) are achieved by recording optical features in a photosensitive material, processing the photosensitive material to create a master, coating the photosensitive material with a layer of silver, electroplating a layer of chromium nickel onto the silver layer and separating the silver layer from the photosensitive material to form a submaster. The silver submaster may then be used to create final optical products by embossing or injection molding.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features of the present invention, and of the construction and operation of typical mechanisms provided with the present invention, will become more readily apparent by referring to the exemplary, and therefore nonlimiting, embodiments illustrated in the drawings accompanying and forming a part of this specification, and in which.

DESCRIPTION OF PREFERRED EMBODIMENTS

Figure 1:
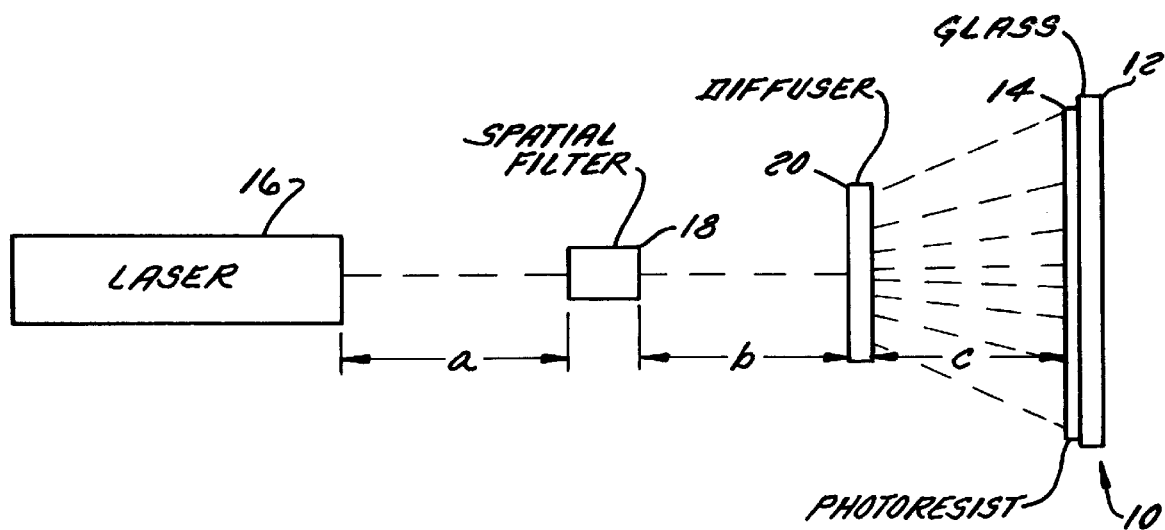
FIG. 1 illustrates a method of recording a photoresist/glass master.

In accordance with the present invention, a photoresist/glass master can be preserved by substantially altering the standard methods now described. One standard process for manufacturing an optical product such as a diffuser or viewing screen utilizing a master and several submasters in sequence is as follows. In order to make, for instance, a 30°×80° optical diffuser, the first step is to produce a photoresist/glass master on the order of approximately 12"× 12" for example. Suitable processes for recording the photoresist/glass master may be used including those described in the above-referenced U.S. patents. Referring to FIG. 1, a photoresist/glass master 10 is shown to comprise a glass substrate 12 having a photoresist layer 14 thereon. The photoresist is exposed to light from a laser 16 which is passed through a spatial filter 18 and then through a diffuser 20 which may be a ground glass diffuser or a diffuser recorded in accordance with the methods of the above-referenced U.S. patents. The diffuser 20 is used as the object for recording the photoresist 14 on the glass plate 12 and provides the features necessary to record speckle in the photoresist 14. The photoresist used may be Shipley 287 by Shipley, 2300 Washington St., Newton, Mass. 02162. This particular type of photoresist is sensitive to wavelengths of approximately 413 nanometers and therefore a 413 nm krypton laser may be used as the light source. The photoresist 14 may be applied to the glass plate 12 using standard techniques such as pouring the photoresist on the glass plate and spinning it to spread out the photoresist over a majority of the glass plate. The thickness of the photoresist may vary but is preferably in the range of 5–45 μm, and even more preferably about 25 μm.

To record a 30°×90° diffuser, for example, the master 10 is first recorded with light from laser 16 so as to record approximately a 60°×130° speckle pattern. Recording the master with a pattern that produces an angular output of 60°×130° instead of 30°×90° is necessary due to expected shrinkage of the material in subsequent processing and generation of submasters. One of the 60° or 130° directions is recorded in the master 10 first, and then the master 10 is rotated 90° to record the other direction. The distance c is (between the diffuser 20 and the master 10) adjusted to record a 60° or 130° angular spectrum output characteristic respectively, as described in one or more of the above-referenced U.S. patents. As explained in those patents, the size of the angular spectrum of the output of the recorded photoresist 14 varies inversely with the distance c and with the size of the features in the diffuser used as the object during recording. Various recording set ups are shown in the above-referenced U.S. patents to achieve widely varying angular spectrums.

After the photoresist/glass master is recorded with the coherent laser light from laser 16, the master 10 is exposed to ultraviolet light to establish the polymeric cross linking necessary to harden the photoresist. Suitable UV processes may be used, including those described in the above-referenced U.S. patents. After UV exposure, the master 10 is wet processed in developer such as Shipley Microposit 303A Developer to substantially stop the polymeric cross linking and hardening. After wet processing, the master 10 may preferably be exposed to fluorescent light overnight to complete the reaction or curing. After exposure to fluorescent light, the master is used to make a first generation submaster, as is now explained.

Figure 2:
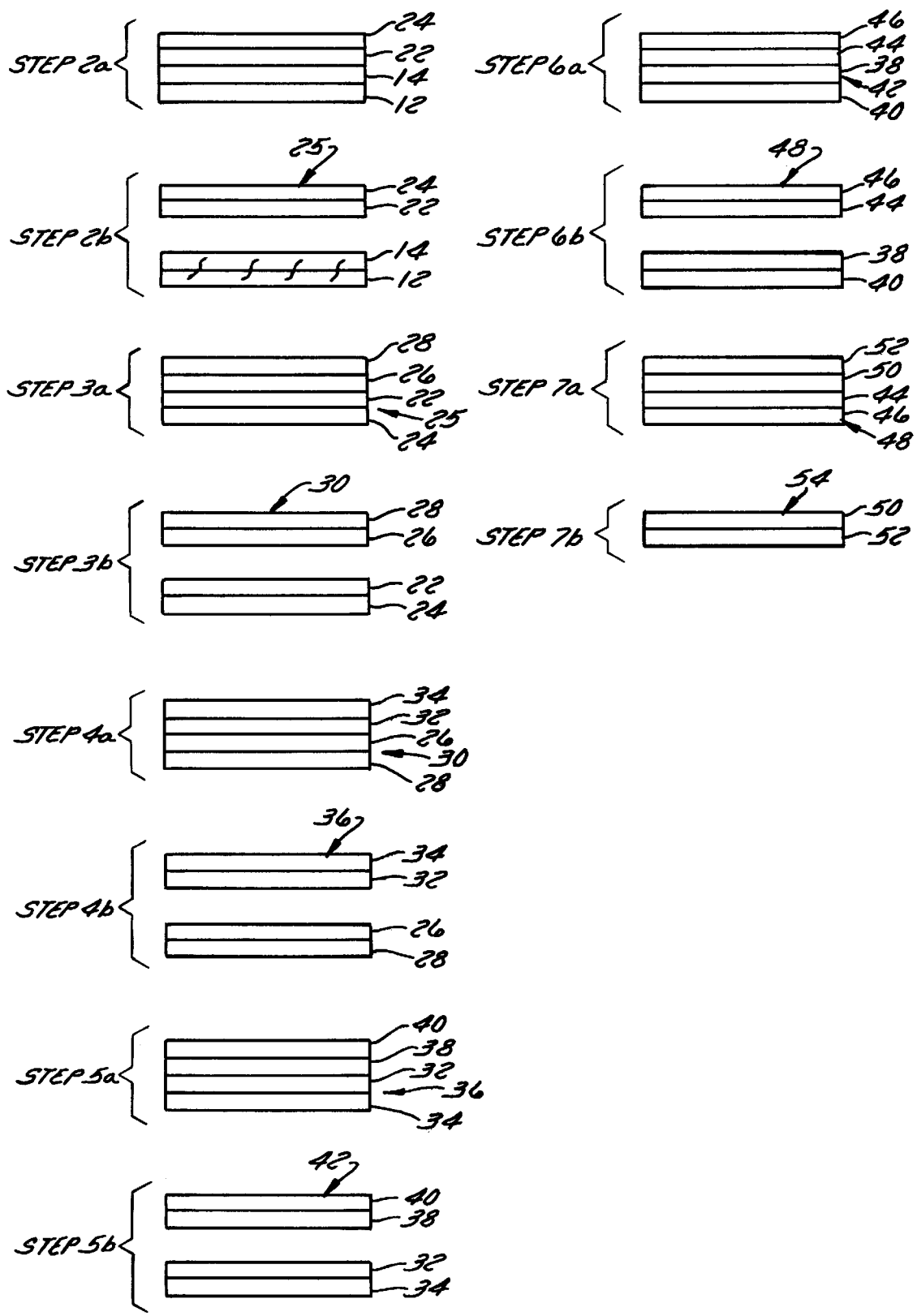
FIG. 2 illustrates the steps of replicating a master and several sequential submasters.

Referring to Step 2a of FIG. 2, a first generation submaster is created by preferably placing a bead of Norland Optical Adhesive #63 22 along one edge of the photoresist layer 14. A polycarbonate sheet 24 or any other suitable sheet is placed over the bead of epoxy. Pressure is then applied to the plastic substrate preferably starting over the bead and continuing outward, to spread the bead out uniformly between the photoresist layer 14 and the polycarbonate sheet 24. After the epoxy is uniformly spread out, the sandwich including glass 12, photoresist 14, epoxy 22, and polycarbonate sheet 24 as shown in FIG. 2a is UV cured in accordance with standard techniques.

Referring to Step 2b of FIG. 2, after UV curing, the master 10 comprising the glass 12 and the photoresist 14 is separated from the epoxy 22 and polycarbonate sheet 24, between the photoresist 14 and the epoxy 22. In doing so the photoresist 14 master is destroyed. Any photoresist remaining on the epoxy 22 after separation may be washed off with acetone or other suitable material in accordance with standard procedures. At this stage, the creation of the first generation submaster 25, as seen in FIG. 2b, is complete. This first generation submaster 25 will not yet have the desired optical characteristics but will perhaps have an angular spectrum of approximately 120°×55°.

Figure 3A:
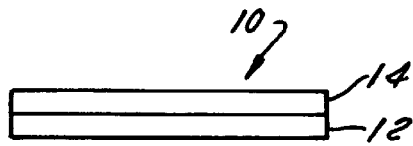
FIGS. 3a–d show a side elevational view of a photoresist/glass master, a plan view of the glass master enclosed by a frame, and a side elevational view of the photoresist/glass master covered with a layer RTV silicone rubber, respectively.
Figure 3B:
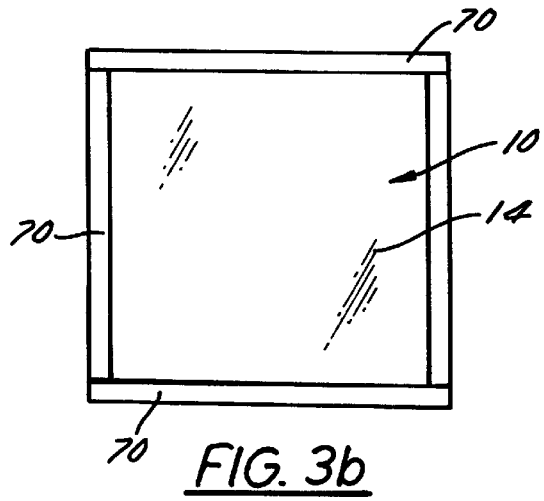

The next step, as shown in steps 3a and 3b of FIG. 2 is to create the second generation submaster in the same way the first generation submaster was created. A bead of either GAF guard 233 or UV-25 Mode Epic, Inc., or other suitable adhesive, is placed along one edge of the cured epoxy 22 which is on polycarbonate sheet 24 and a polycarbonate sheet 28 is placed thereover. As before, the bead of epoxy is squeezed out uniformly between the cured epoxy 22 and the polycarbonate sheet 28 to create an epoxy layer 26. This sandwich of polycarbonate sheet 24, cured epoxy 22, uncured epoxy 26, and polycarbonate sheet 28 is then exposed to UV light to cure the epoxy layer 26. Referring to FIG. 3b, after curing, the sandwich is split between the epoxy 22 and the epoxy 26. At this point, the second generation submaster 30 has been created. This generation submaster 30 will have an angular output of approximately 110°×50°.

The next step, as shown in steps 4a and 4b of FIG. 2 is to create a third generation submaster using the same techniques. The polycarbonate layer 28 with the epoxy 26 is used. A bead of epoxy is placed along one edge of the already cured epoxy layer 26 and polycarbonate layer 34 is placed thereover. As before, the bead of epoxy is squeezed out uniformly between the polycarbonate layer 34 and the already cured epoxy layer 26. This sandwich of polycarbonate sheet 28, cured epoxy 26, uncured epoxy 32 and polycarbonate sheet 34 is then exposed to UV light to cure the epoxy layer 32. Referring to Step 4b, after curing, the polycarbonate layer 28 having the epoxy layer 26 is separated from the polycarbonate layer 34 having the epoxy layer 32 between the epoxy layer 32 and the epoxy layer 26. At this point, the third generation submaster 36 has been created. This third generation submaster 36 will have an angular spectrum output of, say, 105°×40°.

The next step, as shown in steps 5a and 5b of FIG. 2, is to create a fourth generation submaster in the same way as the other submasters were created. The polycarbonate layer 34 having the epoxy layer 32 is used. A bead of epoxy is placed along one edge of epoxy layer 32 and a polycarbonate sheet 40 is placed thereover. The bead of epoxy is squeezed out uniformly in the same manner as before to form an epoxy layer 38 between polycarbonate sheet 40 and epoxy layer 32. This sandwich of polycarbonate sheet 34, cured epoxy 32, uncured epoxy 38, and polycarbonate sheet 40 is then exposed to UV light to cure the epoxy 38. After curing, the polycarbonate layer 34 having the epoxy layer 32 is separated from the polycarbonate sheet 40 having the epoxy layer 38 between the epoxy layer 38 and the epoxy layer 32. This completes creation of the fourth generation submaster 42. This fourth generation submaster will have an angular output of, say, 90°×35°.

As shown in steps 6a and 6b of FIG. 2, the fourth generation submaster comprising the polycarbonate layer 40 and the epoxy layer 38 is then used to create a fifth and final generation submaster. A bead of epoxy is placed along one edge of cured epoxy 38 and a polycarbonate sheet 46 is placed thereover. Again, the bead of epoxy is squeezed out uniformly between the polycarbonate sheet 46 and the already cured epoxy layer 38. This sandwich of polycarbonate sheet 40, epoxy 38, epoxy 44 and polycarbonate sheet 46 is then exposed to UV light to cure the epoxy 44. Referring to FIG. 5b, after curing, the polycarbonate sheet 40 having the epoxy layer 38 is separated from the polycarbonate sheet 46 having the epoxy layer 44 between the epoxy layer 44 and the epoxy layer 38. This completes creation of the fifth generation submaster 48. This fifth generation submaster will have an angular output spectrum of, say, 85°×32° which is very close to the desired angular spectrum of the final product.

The final step, as shown in Steps 7a and 7b of FIG. 2, is to create the final product which is the actual diffuser sold to the end user. The process is similar to the creation of a submaster, but this time a one part epoxy such as preferably GAFGARD 233 is used. Once again, a bead of one part epoxy is placed along one edge of cured epoxy 44 and a polycarbonate sheet 52 is placed thereover. The bead of epoxy is squeezed out uniformly between the polycarbonate sheet 52 and the cured four part epoxy 44 to create a uniform layer 50 of one part epoxy. The sandwich of polycarbonate sheet 46, epoxy 44, epoxy 50, and polycarbonate sheet 52 is then exposed to UV light to cure the one part epoxy 50. After curing, the polycarbonate layer 46 having the epoxy layer 44 is separated from the polycarbonate layer 52 having the one part epoxy layer 50 between the one part epoxy layer 50 and the four part epoxy layer 44. This creates the final product 54 comprising polycarbonate layer 52 having one part epoxy layer 50. This final product will have the desired angular output spectrum of 80°×30°.

In the inventive process, now described, the photoresist/glass master 10, which may be recorded as described in the above-referenced U.S. patents or by using other suitable methods, is replicated without being destroyed in the process. As seen in FIG. 3a, the photoresist/glass master 10 has photoresist layer 14 on glass substrate 12. In general, several rubber masters can be made from the photoresist master 10 and at least 3 epoxy masters can be made from each rubber master. In accordance with the present invention and referring to FIG. 3b, the photoresist/glass master 10 is prepared for replication in accordance with the present invention. A frame 70 made of glass or other suitable material is constructed around the edges of the photoresist/glass master 10 so that the frame rises slightly above the top surface of the photoresist layer 14. After the frame is in place, an elastomeric material, preferably silicone rubber such as Silastic® J or M-2 RTV Silicone Rubber by Dow Corning, Midland, Mich. 48686, is prepared and poured into the frame over the photoresist layer 14. RTV silicone is prepared according to instructions by weighing out 100 parts of RTV silicone rubber base and 10 parts of curing agent in a container. The compound is mixed until the curing agent is completely dispersed in the base and a uniform color is obtained. Thorough mixing is critical to ensure complete curing. Otherwise the features will not be faithfully reproduced in the rubber. After mixing, entrapped air is removed by placing the mixture in a vacuum chamber where pressure is reduced to about 20 millitorr, allowing the mixture to completely expand and then collapse. After air evacuation, the compound mixture is poured over the master, avoiding air entrapment. The catalyzed mixture will typically cure to a flexible rubber in 24 hours, at which time the master can be peeled away from the rubber. While RTV silicone is the preferred rubber, other synthetic elastomers capable of realizing the surface features recorded in the photoresist layer 14 may be used, as would be apparent to one of ordinary skill.

Figure 3D:
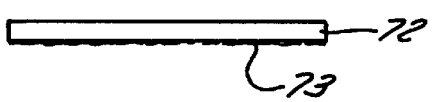

The frame 70 prevents the RTV silicone rubber from running off the photoresist/glass master 10. The thickness of the RTV silicone rubber may preferably be in the range of 1–5 millimeters, 5 millimeters being preferable. Although a thick rubber layer is desirable since it is easier to handle, the RTV silicone rubber is very expensive so the amount used may be minimized. The RTV silicone rubber layer is cured as necessary, preferably for about 24 hours. After curing is complete, the RTV rubber layer 72 is separated from the photoresist layer 14 by carefully peeling it off the photoresist layer, such as picking up one corner by hand. Referring to FIG. 3d, the surface 73 of the removed RTV rubber layer 72 that was in contact with the photoresist layer 14 contains the surface structure, i.e., the optical surface features, present in the photoresist layer 14. Critically, the removal of the RTV silicone rubber layer 72 does not destroy the photoresist/glass master 10 including the glass substrate 12 and the photoresist layer 14. This permits the photoresist/glass master 10 to be filed in a library of masters to be used for future submaster generation.

After the RTV submaster is created, it can then be used to create the necessary additional generations of epoxy submasters by the method, as described above in steps 3–7 of FIG. 2, except instead of using Norland 63, GAFGARD 233 or UV-25 may be used, placing a bead of epoxy over one edge of the submaster, placing a polycarbonate sheet thereover, squeezing out the epoxy bead uniformly between the polycarbonate sheet and the rubber submaster, UV curing the epoxy, and then separating the epoxy from the rubber. Third and subsequent submasters may then be made from the second generation submaster as described above and illustrated in steps 3–7 of FIG. 2. Furthermore, numerous second generation submasters may be created from a single rubber submaster and thereby the rubber submaster can be placed in a library of rubber submasters for use in generating additional second generation submasters in the future.

One benefit of using RTV silicone rubber is that shrinkage is reduced because the curing time of RTV silicone rubber is relatively slow compared to prior methods. Because shrinkage is less, the angular output spectrum of the photoresist/glass master can be less than what otherwise would be necessary using prior methods. In the previous example, the photoresist/glass master was recorded to have an angular output of 130°×60° in order to produce a final optical product having a 90°×30° angular spectrum. With the use of RTV rubber, the photoresist/glass master 10 can be recorded with an angular spectrum of approximately 120°× 50° for example, and thereby at least one fewer submaster generations are needed than with the previous method. This yields important benefits. First, by eliminating one submaster generation, time and materials are saved. Second, quality of the final product is enhanced because the master need not have as high an angular output. Third, recording a high angular output master is more susceptible to contamination and vibration than recording low angular output masters. In particular, the former recording process is sensitive to dirt because the small feature sizes needed to record a high angular output spectrum master approaches the size of dust and other dirt particles present during the recording process. Furthermore, the entire photoresist/glass master recording process is very sensitive to vibration, and the effect of vibration is more pronounced during recordation of high angular output spectrum masters. The present invention, by reducing shrinkage, makes it unnecessary to start with as high an angular output master as was previously required thus improving recording quality and efficiency.

Figure 4A:
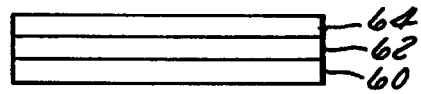
FIGS. 4a–d illustrate an alternative replication technique using a metal shim.
Figure 4B:
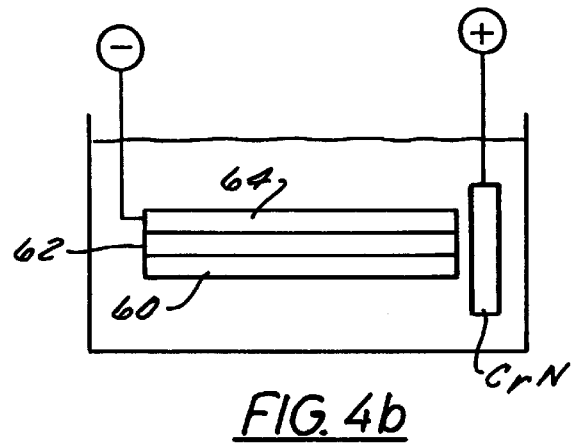
Figure 3C:
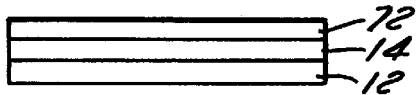
Figure 4C:
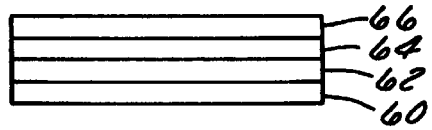
Figure 4D:
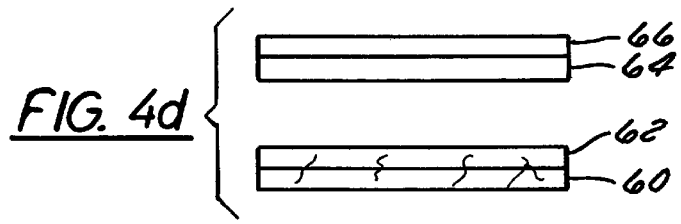

An alternative way to create a final optical product having the desired optical characteristics is to first create a metal shim. This procedure has its advantages but, like the prior procedures, destroys the photoresist/glass master. As seen in FIG. 4a, this procedure uses a glass master 60 having a layer of photoresist 62 thereon. The thickness of the photoresist may be approximately 20 microns although other thicknesses may advantageously be used. A layer of silver 64 approximately in the range of 500–1000 Angstroms thick may be vacuum coated onto the photoresist layer 62 using standard processes. As seen in FIG. 4b, this sandwich of layers 60, 62, 64 may be placed in solution with an anode connected to the silver layer 64 and a cathode attached to a chromium nickel plate in the same solution to thereby deposit a layer of chromium nickel 66 onto the silver layer 64 as shown in FIG. 4c. As seen in FIG. 4d the silver layer 64 is then released from the photoresist layer 62 thereby destroying the glass layer 60 as well as the photoresist layer 62. The remaining chromium nickel layer 66 which is approximately in the range of 6 mil–1 cm thick along with the silver layer 64 may then be used in a standard embossing or injection molding step to create the final optical product.

Other objects, features, and advantages of the invention will become more apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

Many other changes could be made to the invention as described above without departing from the spirit thereof. The scope of these changes will become apparent from the appended claims.

What is claimed is:

1. A method of generating a submaster for an optical product, the method comprising the steps of:
   recording a surface structure in a photosensitive layer of material;
   processing the photosensitive layer of material producing a master optical product;
   mixing a rubber compound with a curing agent until the curing agent is dispersed in the rubber compound;
   removing entrapped air from the mixed rubber compound;
   pouring the rubber compound directly over the surface structure of the master optical product without using a release agent;
   curing the rubber compound; and
   separating the cured rubber compound and the master optical product without destroying the surface structure of the master optical product.

2. The method of claim 1 wherein the rubber compound is a synthetic elastomer.

3. The method of claim 1 wherein the rubber compound is RTV silicone.

4. The method of claim 1 wherein the rubber compound comprises a layer having a thickness of about 5 millimeters.

5. The method of claim 1 wherein the step of pouring the rubber directly over the processed photosensitive layer of material comprises pouring the rubber compound into a frame enclosing the master optical product.

6. The method of claim 1 wherein the step of recording the photosensitive layer of material comprises generating the surface structure in the photosensitive layer of material using coherent light.

7. The method of claim 1 wherein the step of recording the photosensitive layer of material comprises generating the surface structure in the photosensitive layer of material using incoherent light.

8. The method of claim 1 further comprising using the submaster to create additional generations of submasters by:
   covering the submaster with a layer of epoxy;
   covering the layer of epoxy with a plastic substrate;
   curing the epoxy; and
   separating the epoxy and the submaster.

9. The method of claim 8 wherein the step of covering the submaster with a layer of epoxy comprises:
   placing a bead of epoxy along one edge of the submaster;
   covering the bead of epoxy with the plastic substrate; and
   applying pressure to the plastic substrate to spread the bead of epoxy uniformly between the submaster and the plastic substrate.

10. The method of claim 8 wherein the layer of epoxy comprises a four part epoxy.

11. The method of claim 8 wherein the layer of epoxy comprises a one part epoxy.

12. A method of generating a submaster for an optical product, the method comprising the steps of:
   recording optical features in a photosensitive layer of material;
   processing the photosensitive layer of material to create a master optical product;
   mixing a rubber compound with a curing agent until the curing agent is completely dispersed in the rubber compound;
   removing entrapped air from the mixed rubber compound;
   pouring a layer of the rubber compound directly over the optical features of the master optical product without using a release agent;

curing the rubber compound;

separating the cured rubber compound and the master optical product to form a rubber submaster; and repeating at least once the steps of pouring, curing and separating using the same master optical product.

13. The method of claim 12 wherein the rubber compound is a synthetic elastomer.

14. The method of claim 12 wherein the rubber compound is RTV silicone.

15. The method of claim 12 wherein the rubber compound comprises a layer having a thickness of about 5 millimeters.

16. The method of claim 12 wherein the step of recording the photosensitive layer of material comprises generating a surface structure as the optical features in the photosensitive layer of material using coherent light.

17. The method of claim 12 wherein the step of recording the photosensitive layer of material comprises generating a surface structure as the optical features in the photosensitive layer of material using incoherent light.

18. The method of claim 12 wherein the step of pouring a layer of rubber compound over the master comprises pouring the rubber compound into a frame enclosing the master.

19. The method of claim 12 wherein the step of pouring a layer of rubber compound directly over the master optical product comprises pouring the rubber compound into a frame enclosing the master optical product.

20. The method of claim 1, further comprising the step of:

re-using the master optical product to make additional submasters.

21. The method of claim 1, wherein removing entrapped air from the mixed rubber compound comprises:

placing the rubber mixture in a vacuum chamber where the pressure is reduced to approximately 20 millitorr.

22. The method of claim 12, wherein removing entrapped air from the mixed rubber compound comprises:

placing the rubber mixture in a vacuum chamber where the pressure is reduced to approximately 20 millitorr.

* * * * *